(12) United States Patent
Daniels et al.

(10) Patent No.: US 8,230,013 B2
(45) Date of Patent: Jul. 24, 2012

(54) EXTENDING NAME SPACE SIZE OF LEGACY GROUP COMMUNICATION SYSTEMS

(75) Inventors: Kenneth A. Daniels, Warwick, RI (US); Andrew J. Mauer, Poughkeepsie, NY (US); Shlomit Pinter, Haifa (IL); Alan Wecker, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 12/346,696

(22) Filed: Dec. 30, 2008

(65) Prior Publication Data
US 2010/0169433 A1 Jul. 1, 2010

(51) Int. Cl.
*G06F 15/16* (2006.01)
(52) U.S. Cl. ........... 709/204; 709/205; 709/206; 726/27
(58) Field of Classification Search .......... 709/204–206; 726/27
See application file for complete search history.

(56) References Cited

U.S. PATENT DOCUMENTS

| 6,457,130 | B2 * | 9/2002 | Hitz et al. ............... 726/27 |
| 7,774,612 | B1 * | 8/2010 | Deutschmann et al. ...... 713/182 |
| 2008/0281967 | A1 * | 11/2008 | Muhlestein et al. .......... 709/226 |
| 2009/0093249 | A1 * | 4/2009 | Zhu et al. ................ 455/433 |

* cited by examiner

*Primary Examiner* — Duyen Doan
(74) *Attorney, Agent, or Firm* — Steven Chiu; Ido Tuchman

(57) ABSTRACT

Techniques for facilitating communication between a first group communication system and a second group communication system. A naming convention of the first group communication system allows at least one name which contravenes a naming convention of the second group communication system. A communicator is joined to the second group communication system. The communicator was previously joined to the first group communication system and has a first name at the first group communication system. The communicator has a second name at the second group communication system. The second name can be requested from the second group communication system. The second name can also be generated by applying an algorithm to the first name. A processor performs translation between the first name and the second name in a communication between the communicator and the second group communication system. The translation is performed based on a translation data structure.

17 Claims, 8 Drawing Sheets

EXTENDING NAME SPACE SIZE OF LEGACY GROUP COMMUNICATION SYSTEMS

BACKGROUND OF THE INVENTION

1. Field of the Invention

The present invention relates generally to group communication systems. More specifically, the present invention relates to techniques for facilitating communication between a first group communication system and a second group communication system.

2. Description of Background

A group communication system is any of a variety of systems known in the art for facilitating communication between two or more entities. The entities may be different computing systems, different applications executing at different computing systems, or both. Communication transmitted by a group communication system may be automatically generated by a software-based process, inputted by a human user, or both. Group communication systems advantageously facilitate communication between applications located at distinct computing systems so that the applications may collaborate to achieve shared goals.

Two notable categories of group communication systems exist. The first such category is the modern group communication service, or MGCS. An MGCS is any of a variety of modern systems for facilitating communication between two or more entities. The second such category is the legacy group communication service, or LGCS. An LGCS is any of a variety of legacy (e.g., older) systems for facilitating communication between two or more entities. Many legacy group communication services known in the art are configured to execute at mainframes.

SUMMARY OF THE INVENTION

One aspect of the invention is a method for facilitating communication between a first group communication system and a second group communication system. A naming convention of the first group communication system allows at least one name which contravenes a naming convention of the second group communication system. The method comprises joining a communicator to the second group communication system. The communicator was previously joined to the first group communication system and has a first name at the first group communication system. The communicator has a second name at the second group communication system. The method further comprises translating by a processor between the first name and the second name in a communication between the communicator and the second group communication system. Translating is performed based on a translation data structure.

In one embodiment of the invention, the method comprises requesting the second name from the second group communication system. In another embodiment of the present invention, the method comprises generating the second name by applying an algorithm to the first name. The algorithm is configured to generate a name complying with the naming convention of the second group communication system.

Another aspect of the invention is a computer program product embodied in a computer usable medium. For example, the computer program product may include one or more tools for facilitating communication between a first group communication system and a second group communication system. A naming convention of the first group communication system allows at least one name which contravenes a naming convention of the second group communication system. Computer readable program codes are coupled to the computer usable medium and are configured to cause the program to join a communicator to the second group communication system. The communicator was previously joined to the first group communication system and has a first name at the first group communication system. The communicator has a second name at the second group communication system. The computer readable program codes are further configured to cause the program to translate between the first name and the second name in a communication between the communicator and the second group communication system. Translating is performed based on a translation data structure.

In one embodiment of the invention, the program code configured to join the communicator to the second group communication system includes program code configured to request the second name from the second group communication system. In another embodiment of the present invention, the program code configured to join the communicator to the second group communication system includes program code configured to generate the second name by applying an algorithm to the first name. The algorithm is configured to generate a name complying with the naming convention of the second group communication system.

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention is described with reference to embodiments of the invention. Throughout the description of the invention reference is made to FIGS. 1-8.

Figure 1:
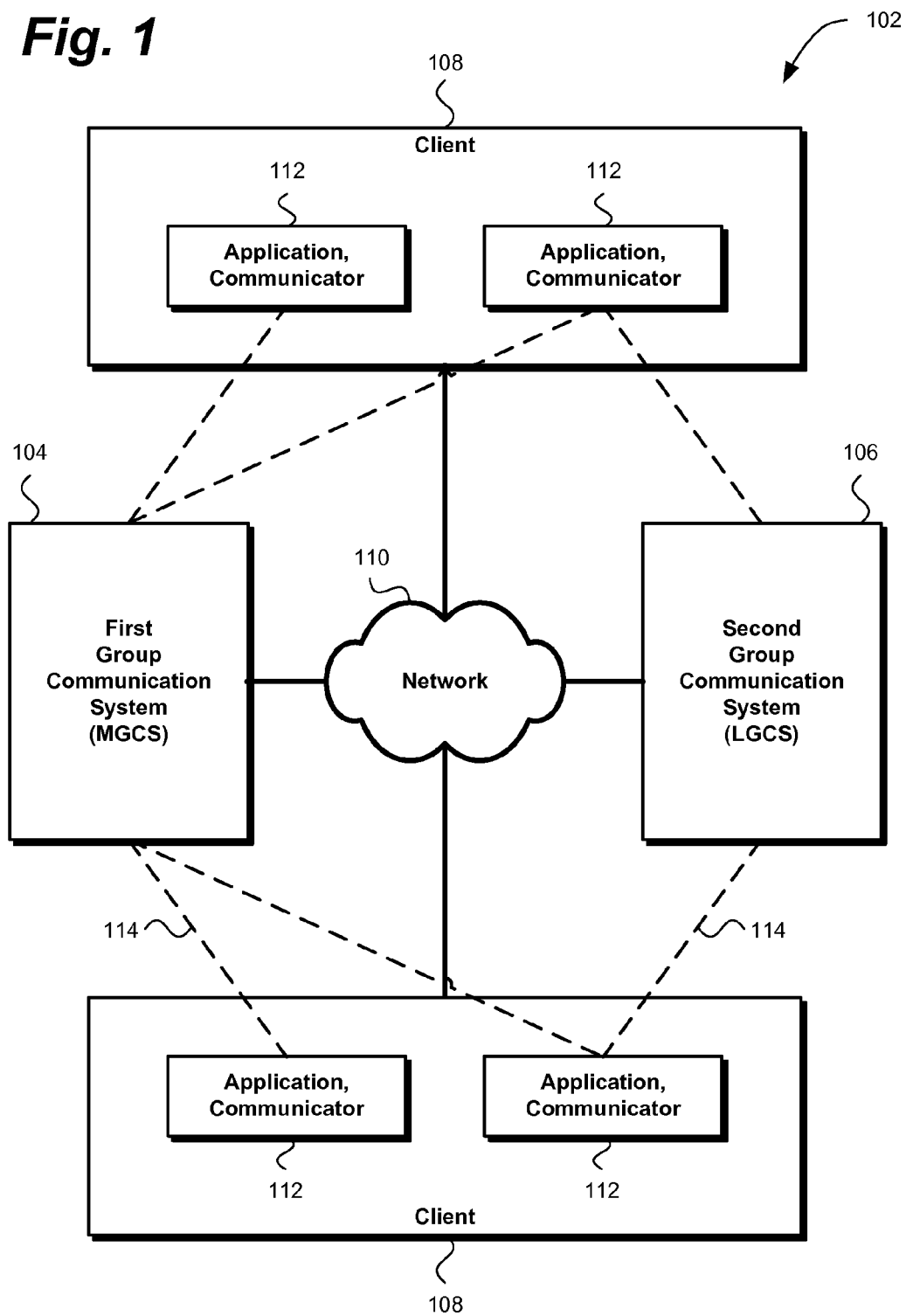
FIG. 1 shows an example environment embodying the present invention.

Turning to FIG. 1, an example environment 102 embodying the present invention is shown. It is initially noted that the environment 102 is presented for illustration purposes only, and is representative of countless configurations in which the invention may be implemented. Thus, the present invention should not be construed as limited to the environment configurations shown and discussed herein.

The environment 102 includes two group communication systems 104, 106. As used herein, the term "group communication system" includes any system configured to facilitate communication between two or more entities. The entities between which communication is facilitated may be computing systems.

Specifically, the environment 102 includes a first group communication system 104. The first group communication system may be a modern group communication service, or MGCS. The first group communication system may be facilitated by one or more computing systems. Each such computing system may be a server. More specifically, each such server may be a mainframe. Each such computing system may be based on a general purpose operating system such as the IBM® z/OS® operating system, the IBM AIX® operating system, the IBM MVS™ operating system, the Linux® operating system, any flavor of the UNIX® operating system or the Windows® operating system. IBM, z/OS and AIX are registered trademarks of 1International Business Machines Corporation, Armonk, N.Y., United States, in the United States, other countries, or both. MVS is a trademark of 2International Business Machines Corporation, Armonk, N.Y., United States, in the United States, other countries, or both. Linux® is the registered trademark of Linus Torvalds in the United States and other countries. UNIX is a registered trademark of The Open Group. Windows is a registered trademark of Microsoft Corporation, Redmond, Wash., United States, in the United States and/or other countries.

In an embodiment of the present invention, the first group communication system 104 is the IBM WebSphere® Application Server software for the z/OS operating system. WebSphere is a registered trademark of 3International Business Machines Corporation, Armonk, N.Y., United States, in the United States, other countries, or both. The IBM WebSphere Application Server software is an enterprise application server which is based on open standards and the Java™ platform. Java is a trademark of Sun Microsystems, Inc., Santa Clara, Calif., United States, in the United States and other countries. The second group communication system further includes a layer known as the Distribution and Consistency Services component, or DCS component, which is included in the IBM WebSphere Application Server software. The DCS component is responsible for group communication services. The first group communication system is facilitated by a mainframe executing the z/OS operating system.

The environment 102 further includes a second group communication system 106. The second group communication system may be a legacy group communication service, or LGCS. The second group communication system may be facilitated by one or more computing systems. Each such computing system may be a server. More specifically, each such server may be a mainframe. Each such computing system may be based on a general purpose operating system such as the IBM z/OS operating system, the IBM AIX operating system, the IBM MVS operating system, the Linux operating system, any flavor of the UNIX operating system or the Windows operating system. The second group communication system may be an operating system support service.

In an embodiment of the present invention, the second group communication system is the IBM Cross-System Coupling Facility (XCF) software, a subservice of the MVS Sysplex Services software. The second group communication system is facilitated by a mainframe executing the MVS operating system.

It is noted that LGCS systems generally have more restrictive interface requirements than MGCS systems. Many LGCS systems known in the art are not fully compatible with newer operating systems, applications based on the Java platform, or both.

The environment further includes a plurality of clients 108. A client may be any technological device configured to interact with one or more other technological devices. A client is configured to communicate with such technological devices using a group communication service. Specifically, a client may be configured to communicate using an MGCS, an LGCS, or both.

A client 108 may be a general purpose computer. Such a computer may incorporate any of a wide variety of architectures. The computer may be based on a general purpose operating system such as the IBM z/OS operating system, the IBM AIX operating system, the IBM MVS operating system, the Linux operating system, any flavor of the UNIX operating system or the Windows operating system. A client may also be a device other than a general purpose computer. Such devices may include hardware devices manufactured to perform a specific task. Such devices may also include personal digital assistants (PDA's) and mobile telephones. It is noted that the clients may be heterogeneous. Specifically, they may differ from each other in architecture, operating system or other important respects.

The environment 102 further includes a network 110. The network may be any of a wide variety of systems known in the art for allowing two or more systems to communicate. The network may comprise any of a wide variety of networks such as the Internet, the public switched telephone network (PSTN), local area networks (LAN's) and wide area networks (WAN's). The network may employ any of a wide variety of network technologies such as Ethernet, IEEE 802.11, IEEE 802.16, the Bluetooth® technology, token ring, Digital Subscriber Line (DSL), cable Internet access, satellite Internet access, Integrated Services Digital Network (ISDN) and dial-up Internet access. Bluetooth is a registered trademark of Bluetooth SIG, Inc., Bellevue, Wash., United States. The network may include various topologies and protocols known to those skilled in the art, such as TCP/IP, UDP, and Voice over Internet Protocol (VoIP). The network may comprise direct physical connections, radio waves, microwaves or any combination thereof. Furthermore, the network may include various networking devices known to those skilled in the art, such as routers, switches, bridges, repeaters, etc.

It is noted that the network 110 is not essential to the present invention. For example, a client 108 may be connected to a group communication system 104, 106 via a direct hardware connection.

Each client 108 may execute one or more applications 112. An application may be any computer program product. An application may be configured to communicate with one or more other applications. In turn, the one or more other applications may be executing at one or more other clients.

As used herein, the term "communicator" means any system configured to communicate via a group communication system. A communicator may be implemented in hardware, software or a combination thereof. In particular, communicators may include clients 108, applications 112 executing thereat, or both. All of the applications shown in FIG. 1 are communicators.

A communicator 112 may be joined 114 to a group communication system 104, 106. A communicator thus joined to a group communication system is known as a member of the group communication system. Once joined to a group communication system, a member may communicate with other members of the group communication system. A join may also be referred to as an insert.

Two general types of events may cause a communicator 112 to cease being a member of the group communication system 104, 106. The first type of event is removal from the group communication system. A member may elect to remove itself from the group communication system. For example, the purpose for which the member communicated via the group communication system may have been accomplished.

The second type of event is a failure state. A failure state may be any condition preventing a member of the group communication system from continuing to communicate via the group communication system. For example, a computer executing the member may have been disconnected from the network 110 or may have simply crashed.

Each group communication system 104, 106 may include functionality to monitor the liveness state of each member joined to the group communication system. The liveness state of a member classifies the member as either alive or dead. A member of the group communication system which is operable to communicate via the group communication system is considered to be alive. Conversely, a member which is in a failure state is considered to be dead.

A member 112 of a group communication system 104, 106 must be able to uniquely identify another member in order to communicate with that member. Therefore, a name is assigned to each member of each group communication system. Each such name is unique within the same group communication system. However, if a communicator is joined 114 to multiple group communication systems, the communicator may have a different name at each group communication system.

Modern group communication services known in the art typically have flexible naming conventions for the names which may be assigned to members thereof. A naming convention of a group communication service may include one or more rules specifying requirements for allowable names by which communicators may be known at the group communication service. In particular, naming conventions of MGCS systems typically allow names to be very long. As a result, MGCS systems typically have very large namespaces. The namespaces may have few constraints thereon.

By contrast, many legacy group communication services known in the art have restrictive naming conventions for the names which may be assigned to members thereof. In particular, naming conventions of LGCS systems may impose relatively restrictive limits on the length of a name. As a result, LGCS systems frequently have smaller namespaces than MGCS systems.

As previously noted, the first group communication system 104 is an MGCS. The first group communication system has a flexible naming convention allowing very long names for members 112 thereof. In an embodiment of the present invention, the naming convention of the first group communication system allows names of members thereof to be up to 128 characters in length. In another embodiment of the present invention, the naming convention of the first group communication system allows names of members thereof to be up to 256 characters in length.

By contrast, the second group communication system 106 is an LGCS. The second group communication system has a restrictive naming convention imposing restrictive limits on the length of names of members 112 thereof. It is emphasized that as a result, the naming convention of the first group communication system 104 allows many names which contravene the naming convention of the second group communication system.

In an embodiment of the present invention, the second group communication system allows names of members thereof to be up to 16 characters in length. The names of members may be required to contain only unaccented letters (e.g., "A" through "Z"), digits (e.g., "0" through "9"), dollar signs ("$"), pound signs ("#") and at signs ("@"). Moreover, letters used in names of members and groups may be required to be upper case. In another embodiment of the present invention, the second group communication system allows names of members thereof to be up to 8 characters in length. The names of members may be required to contain only the characters described for the preceding embodiment.

Moreover, the second group communication system may allow names of groups thereat to be up to 8 characters in length. The names of groups may be required to contain only the characters described above.

In many cases, a communicator 112 may simultaneously be a member of multiple group communication systems 104, 106. In this case, the communicator may have a different name at each group communication system.

In particular, a communicator may simultaneously be a member of both an MGCS and an LGCS. For example, an MGCS may leverage an LGCS on behalf of an application configured to utilize the MGCS. In this case, the communicator may have a different name at the MGCS than at the LGCS.

As previously noted, a given LGCS may have a more restrictive naming convention and a smaller namespace than a given MGCS. Thus, the name by which a member 112 is known at the MGCS may contravene the naming convention of the LGCS. Simply put, the LGCS cannot handle the name by which the member is known at the MGCS. When this condition exists, the member clearly must have a different name at the MGCS than at the LGCS. In particular, because the naming conventions for LGCS systems known in the art typically impose length restrictions, the name of a member at the MGCS will frequently be longer than the name of the member at the LGCS.

More generally, the name by which a member 112 is known at the first group communication system 104 may contravene the naming convention of the second group communication system 106. When this condition exists, the member clearly must have a different name at the first group communication system than at the second group communication system.

It is noted that the same member 112 may have different names at different group communication systems 104, 106 for reasons other than limitations imposed by naming conventions. It may be advantageous or necessary for a member to have different names at different group communication systems due to any number of implementation considerations.

Therefore, if a member is joined to both an MGCS and an LGCS simultaneously, the name of the member at the MGCS is mapped to the name of the member at the LGCS. More generally, if a member 112 is joined to multiple group communication systems 104, 106 simultaneously, the name of the member at each group communication system is mapped to the name of the member at every other group communication system.

In the environment shown in FIG. 1, each of the applications 112 is a communicator. Each communicator is independent of every other communicator. Each communicator shown in FIG. 1 was previously joined 114 to the first group communication system 104. A communicator which is joined to a group communication system is denoted with a dotted line in FIG. 1.

As previously noted, the first group communication system shown in FIG. 1 is an MGCS. Each communicator may comprise, or may be associated with, a process at the MGCS. Each such MGCS process is independent of every other MGCS process.

Moreover, any of the communicators 112 may potentially become a member of the second group communication system 106. As previously noted, the second group communication system shown in FIG. 1 is an LGCS. Thus, any of the communicators may be joined 114 to the LGCS. Specifically, a communicator may be joined to an LGCS system group requiring communication services for all group members.

It is emphasized that joining 114 the second group communication system 106 does not cause a communicator 112 to become disconnected from the first group communication system 104. Thus, any communicator shown in FIG. 1 which is joined to the second group communication system is simultaneously joined to both group communication systems.

Each communicator 112 has a first name at the first group communication system 104, e.g., the MGCS. The name of a communicator at an MGCS may be known as a process name. The communicator may be configured to identify itself according to the first name, e.g., the process name. Furthermore, each communicator joined 114 to the second group communication system 106 has a second name at the second group communication system, e.g., the LGCS. The communicator may be unaware of the second name, may not be configured to identify itself according to the second name, or both.

Thus, in communication between the communicator and the LGCS, translation between the name of the communicator at the MGCS and the name of the communicator at the LGCS is performed.

More generally, in communication between the communicator 112 and the second group communication system 106, translation between the first name of the communicator at the first group communication system 104 and the second name of the communicator at the second group communication system is performed.

The topology or network layer of a modern group communication service may comprise one or more group partitions. A group partition may be any condition preventing communicators 112 from directly accessing each other. Examples of such conditions include physical disconnections and ineffective load balancing. The one or more group partitions result in two or more network segments. Each network segment is isolated from every other network segment. Members of a group at a global MGCS may thus be separated from each other by the one or more group partitions.

Network partitions can be illustrated using an example environment wherein identical copies of a distributed computing environment are configured. The first identical copy is a production environment, while the second identical copy is a test environment. The production environment and the test environment contain the same group and member names in terms of MGCS terminology. However, the production environment and the test environment are accessed via different IP addresses, different port numbers, or both. The members of the production environment do not have the connection details of the members of the test environment, and vice versa. As a result, the production environment and the test environment are on distinct network segments.

As another example, in distributed systems, the members and groups in one copy of the environment do not know of the members and groups in any other copy of the environment. This is because the members and groups do not have the connection details of the members and groups in any other copy. As a result, each copy of the distributed system is effectively on a network segment. Even if there is a physical network connection, communication is not possible without the relevant connection details.

In both examples, the members at each network segment are partitioned from each other. Members at different network segments may share the same names. The members at each network segment continue to function to some extent. This is because the members on the same network segment retain the ability to communicate with each other. Conversely, members at a network segment view members at any other network segment as having failed.

Once the network partition is present, changes to the membership at one network segment are not reflected at any other network segment. Specifically, some communicators may join at a first network segment, while other communicators may join at a second network segment. However, any communicators joined at one network segment are not joined at any other network segment. Similarly, some communicators included at a given network segment may elect to be removed from the group communication system. However, any members removed at one network segment are not removed at any other network segment. Likewise, some communicators included at a given network segment may fail. However, any members which have been detected as having failed at any network segment are not detected as having failed at any other network segment.

More generally, a network partition prevents changes to the membership at one network segment from being reflected at any other network segment. This occurs because the network partition prevents members at any network segment from viewing members at any other network segment. Specifically, the network partition prevents members at any network segment from being aware of any additions or removals of members at any other network segment. Thus, any members joined at one network segment are prevented from being joined at a different network segment. Similarly, any members removed at one network segment are prevented from being removed at a different network segment. Likewise, any members which have been detected as having failed at one network segment are prevented from being detected as having failed at a different network segment.

When one or more partitions are present, two different members of a group communication system which are included at different network segments may potentially be assigned the same name at the group communication system. In particular, identical names at an LGCS may be generated for two different members thereof. For example, a member, "A", and another member, "B", may be on different network segments. Member A may have a first name, "LongA", at the first group communication system. Member A may also be assigned a second name, "ShortA", at the second group communication system. Member B may have a first name, "LongB", at the first group communication system. Member B may also be assigned a second name, "ShortA", at the second group communication system. This may occur because member "B" cannot see member "A" or any details thereof. As a result, member "B" is unaware that the name, "ShortA", has already been assigned. It is noted that this drawback is particularly likely in any system configured to assign names using a sequential algorithm. For example, a system may assign sequential numbers as names so that the name "000001" is assigned first, followed by the name "000002", and so on. In this case, both members would be assigned a second name of "000001" because each member is the first member on its network segment.

The network partition prevents the two network segments from being aware that overlapping names were assigned. The legacy group communication service layer is operational across all network segments. Therefore, the legacy group service layer sees both communicators which are known by the overlapping name. As a result, a naming collision is generated.

Furthermore, it may be necessary to combine all of the network segments once the network partition is corrected. However, once the network segments are combined, any members at different network segments which were assigned the same name will be considered as a single member. Therefore, it is advantageous for assigned names to be unique across all network segments even when one or more network partitions are present.

It is emphasized that for a MGCS to interoperate with an LGCS effectively to achieve member communication and notification, two issues must be addressed. The first issue is the fact that the MGCS has a relatively flexible naming convention and the LGCS has a relatively restrictive naming convention which disallows many names allowed at the MGCS. Therefore, translation must be performed between different names of communicators which are simultaneously joined to both the MGCS and the LGCS. The second issue is the possibility of a network partition—and therefore a namespace partition—as described above. Specifically, the system must behave intelligently even when one or more network partitions are present.

The first name may be recorded at a data area implemented in some legacy group communication services. Each member of the LGCS may be associated with such a data area. The data area may be populated upon joining the member to the LGCS. However, even when such a data area is implemented, it may not be large enough to hold any allowable name at the modern group communication service. This solution, by itself, is therefore ineffective at addressing the issues noted above for many LGCS systems known in the art.

A system-wide hashmap may also be employed to translate the first name to the second name and vice versa. However, when a network partition is present, each network segment may have a different copy of the hashmap. This condition is disadvantageous per se. This condition also means that a risk still exists that communicators with different first names may be assigned the same second name. Therefore, a system-wide hashmap, by itself, is ineffective at addressing the issues noted above when a network partition is present.

Moreover, a user may provide a name map associating first names and second names. However, this approach disadvantageously decreases software maintainability. For example, additional parameters may be required or existing components may be broken. Moreover, this approach disadvantageously requires defining an extra protocol between the second group communication system (e.g., the IBM XCF software or another LGCS) and a member thereof in order to ask for a different name to be entered in case of a name collision at the second group communication system.

Figure 2:
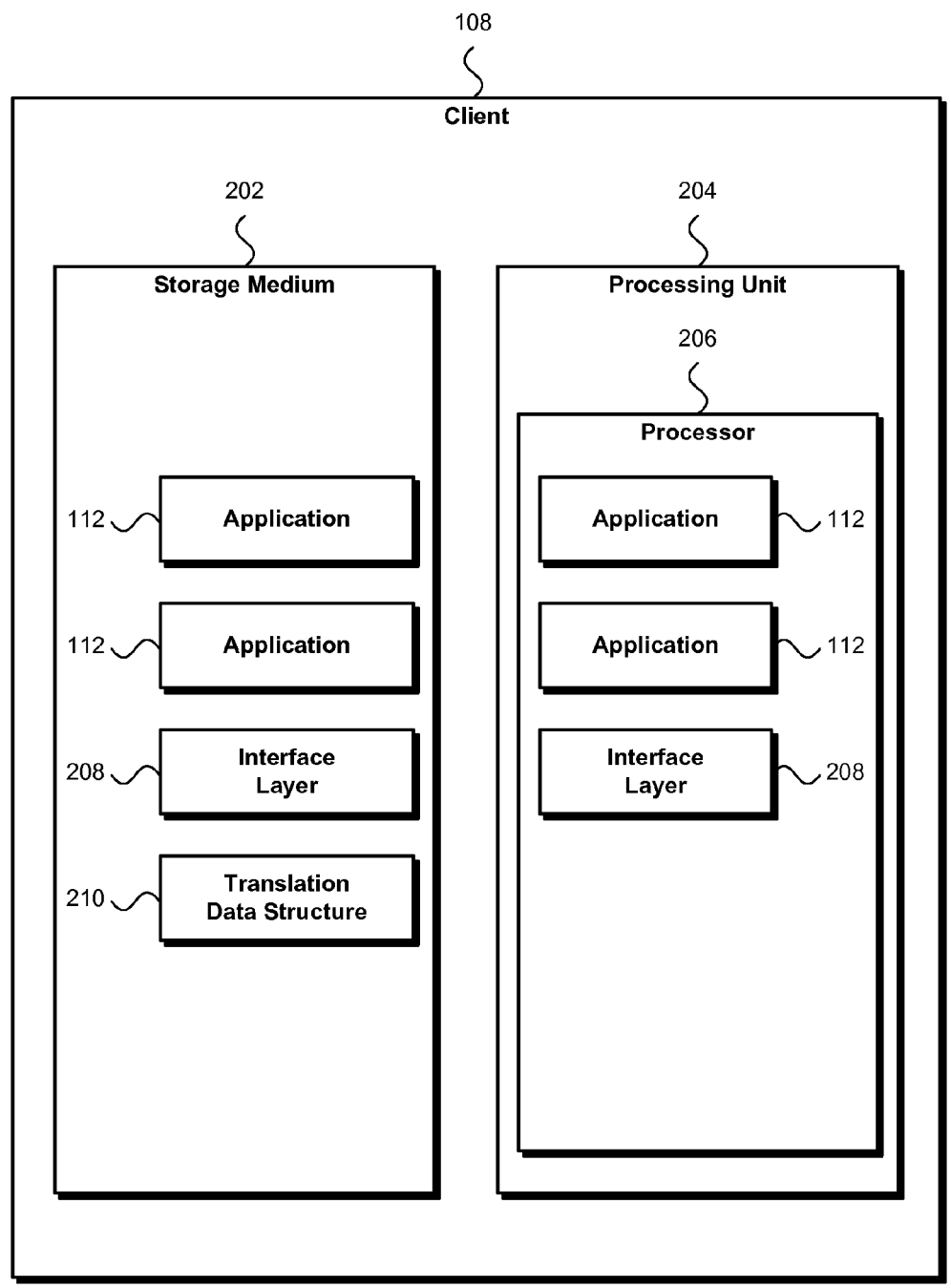
FIG. 2 illustrates additional detail about an example client embodying the present invention.

Turning now to FIG. 2, additional detail about an example client 108 implementing the present invention is illustrated.

A client 108 may comprise a storage medium 202 configured to store data in a computer usable format. The storage medium may comprise any of a variety of technological devices configured to store data. Such technological devices may include without limitation hard drives, optical drives, floppy drives, random access memory (RAM), read-only memory (ROM), and erasable programmable read-only memory (EPROM or Flash memory). In particular, the storage medium may be a computer usable memory.

A client 108 may further comprise a processing unit 204 embedded in hardware, software or a combination thereof. The processing unit may comprise one or more processors 206. Specifically, a processor comprised by the processing unit may be a general purpose microprocessor. Each processor comprised by the processing unit is configured to execute program code.

The client 108 may be connected to a variety of peripheral devices. Such peripheral devices may include a keyboard, a mouse and a display.

A client 108 may incorporate any of a wide variety of applications 112. An application may be any computer program product. The computer program product may be embodied in a computer usable memory such as the storage medium 202. Furthermore, the computer program product may comprise computer readable program codes coupled to the computer usable memory. The computer readable program codes may be executed at a processing unit 204, a processor 206 comprised thereby, or both.

An application 112 may be configured to communicate via a group communication system. Therefore, an application may be a communicator. However, applications which do not communicate via any group communication system may also execute at the client.

Each client 108 may comprise an interface layer 208. The interface layer facilitates communication between distinct group communication systems. The interface layer logically connects the distinct group communication systems. Notably, the interface layer may logically connect an MGCS and an LGCS.

Thus, the interface layer 208 shown in FIG. 2 facilitates communication between the first group communication system and the second group communication system shown in FIG. 1. The interface layer logically connects the first group communication system and the second group communication system.

In an embodiment of the present invention, as shown in FIG. 1, the interface layer 208 is located at the client 108.

In another embodiment of the present invention, the interface layer 208 is located at a system other than the client. Thus, the interface layer may act as middleware.

The interface layer 208 may be implemented in hardware, software or a combination thereof. In an embodiment of the present invention, the interface layer is implemented in software. Specifically, the interface layer is implemented as a computer program product. The computer program product is embodied in a computer usable memory such as the storage medium 202 comprised by the client. Furthermore, the computer program product comprises computer readable program codes coupled to the computer usable memory. The computer readable program codes may be executed at a processing unit such as the processing unit 204 comprised by the client, one or more processors such as the processor 206 comprised by the processing unit comprised by the client, or both.

The interface layer 208 is configured to join a communicator to the second group communication system shown in FIG. 1. The communicator thus joined may have been previously joined to the first group communication system shown in FIG. 1 and may have a first name at the first group communication system. The communicator has a second name at the second group communication system.

For each communicator executing at the client, the interface layer 208 is configured to translate between the names by which the communicator is known at the different group communication systems at which the communicator is a member. Accordingly, the interface layer 208 is configured to translate between a first name of a communicator at the first group communication system and a second name of the communicator at the second group communication system in a communication between the communicator and the second group communication system. The interface layer may be configured to perform this translation by causing computer readable program codes configured to perform the translation to be executed by a processor 206. The processor may be the processor comprised by the processing unit 204 comprised by the client 108 or by another system executing the interface layer.

The interface layer 208 may also be configured to detect the state of a communicator at a group communication system. Such detected states may include failure states, states of removal from the group communication system and states of being joined to the group communication system. The interface layer may transmit a notification of the detected state to any other group communication system at which the communicator is a member. Because the communicator may have a different name at different group communication systems, the notification comprises the name of the communicator at the group communication system to which the notification is transmitted.

The interface layer 208 shown in FIG. 2 is configured to detect a state of a communicator at the second group communication system, e.g., the LGCS. Such detected states may include the states described above. The interface layer is further configured to transmit a notification of the detected state to the first group communication system, e.g., the MGCS. The notification comprises the name at which the communicator is known at the first group communication system.

The interface layer 208 may maintain and access a translation data structure 210. The translation steps described above are performed based on the translation data structure. The translation data structure may be stored at a storage medium such as the storage medium 202 comprised by the client.

The translation data structure is a repository of name associations. A name association associates the names used by a given communicator at different group communication systems. The translation data structure may include a name association for each communicator joined to both the first group communication system and the second group communication system.

The translation data structure may be implemented as any of a wide variety of data structures known in the art. In an embodiment of the present invention, the translation data structure is a lookup table.

In another embodiment of the present invention, the translation data structure 210 comprises a single hashmap. Each name association is represented by a single entry in the hashmap. Each entry is a key-value pair. The key of the entry contains the name of the communicator at the second group communication system, e.g., the LGCS. The value of the entry contains the name of the same communicator at the first group communication system, e.g., the MGCS. Clearly, the hashmap facilitates efficient translation from the name of the communicator at the second group communication system to the name of the communicator at the first group communication system. Additionally, "key-from-value" methods provided by the Java platform are invoked to discover the name of the communicator at the second group communication system given the name of the communicator at the first group communication system.

In another embodiment of the present invention, the translation data structure 210 comprises a set of hashmaps. A hashmap may be maintained for each direction in which the name may be converted. Each name association is represented by one entry in each hashmap. Thus, a first hashmap may contain entries for which the key contains the name of a communicator at the first group communication system, e.g., the MGCS, and the corresponding value contains the name of the same communicator at the second group communication system, e.g., the LGCS. A second hashmap may contain entries for which the key contains the name of each communicator at the second group communication system, e.g., the LGCS, and the corresponding value contains the name of the same communicator at the first group communication system, e.g., the MGCS.

Those skilled in the art will appreciate that the first hashmap is optimized for looking up the second name associated with a given first name. Conversely, the second hashmap is optimized for looking up the first name associated with a given second name.

The interface layer 208 may transmit housekeeping messages to, and receive housekeeping messages from, a group communication system. In particular, housekeeping messages may be transmitted to, and received from, an LGCS system such as the second group communication system shown in FIG. 1. The housekeeping messages may assist in maintaining the translation data structure 210. In an embodiment of the present invention, the housekeeping messages are not retransmitted to another group communication system or to a communicator. Therefore, name translation is not performed on the housekeeping messages.

Figure 3:
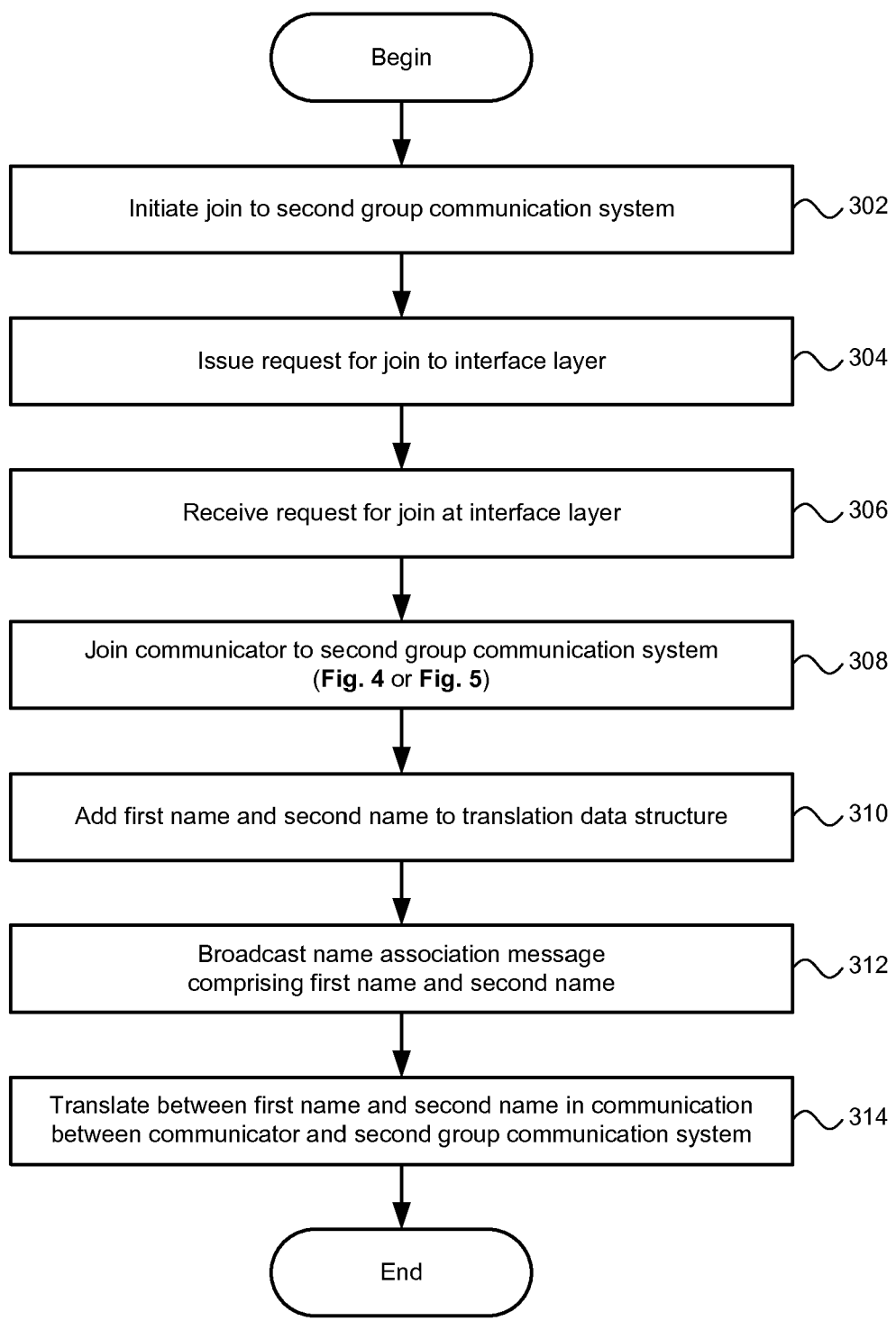
FIG. 3 demonstrates an example sequence of operations for facilitating communication between a first group communication system and a second group communication system.

Turning now to FIG. 3, an example sequence of operations for facilitating communication between a first group communication system and a second group communication system is demonstrated.

The operations shown in FIG. 3 may be performed at an interface layer such as the interface layer shown in FIG. 2, except where otherwise noted. As described above, the interface layer may be implemented in computer readable program codes which are executed at a processor. Therefore, any of the operations performed by the interface layer may be performed at a processor.

The interface layer may exist within an environment such as the environment shown in FIG. 1 and described above in regards to FIG. 1. The first group communication system may be the first group communication system shown in FIG. 1 and may have any of the properties described above in regards to FIG. 1. Similarly, the second group communication system may be the second group communication system shown in FIG. 1 and may have any of the properties described above in regards to FIG. 1.

As previously noted, the first group communication system may have a flexible naming convention allowing members thereof to have very long names. By contrast, the second group communication system may have a restrictive naming convention imposing restrictive limits on the length of a name of a member thereof. Therefore, it may be the case that a naming convention of the first group communication system allows at least one name which contravenes a naming convention of the second group communication system.

The sequence of operations shown in FIG. 3 operates on a communicator. The communicator may be any of the communicators shown in FIG. 1 and may have any of the properties described above in regards to FIG. 1. As of the beginning of the sequence of operations shown in FIG. 3, the communicator is already joined to the first group communication system. Moreover, the communicator already has a first name at the first group communication system.

At initiating operation 302, a join to the second group communication system is initiated. Group member services are thereby requested. Initiating operation 302 may be performed by the communicator. Initiating operation 302 may also be performed by a process at the first group communication system which is associated with the communicator. Initiating operation 302 may also be performed by the first group communication system on behalf of the communicator. After initiating operation 302 is completed, control passes to requesting operation 304.

At requesting operation 304, a request for a join to the second group communication system is issued to the interface layer. Requesting operation 304 may be performed by the communicator. Requesting operation 304 may also be performed by a process at the first group communication system which is associated with the communicator. Requesting operation 304 may also be performed by the first group communication system on behalf of the communicator. The request comprises the first name of the communicator at the first group communication system.

The issued request may comprise a request for a second name by which the communicator is known at the second group communication system. In this case, the operations shown in FIG. 4 may be invoked by joining operation 308 as described below.

After requesting operation 304 is completed, control passes to receiving operation 306.

At receiving operation 306, the request issued at requesting operation 304 is received at the interface layer. After receiving operation 306 is completed, control passes to joining operation 308.

At joining operation 308, the communicator is joined to the second group communication system.

Figure 4:
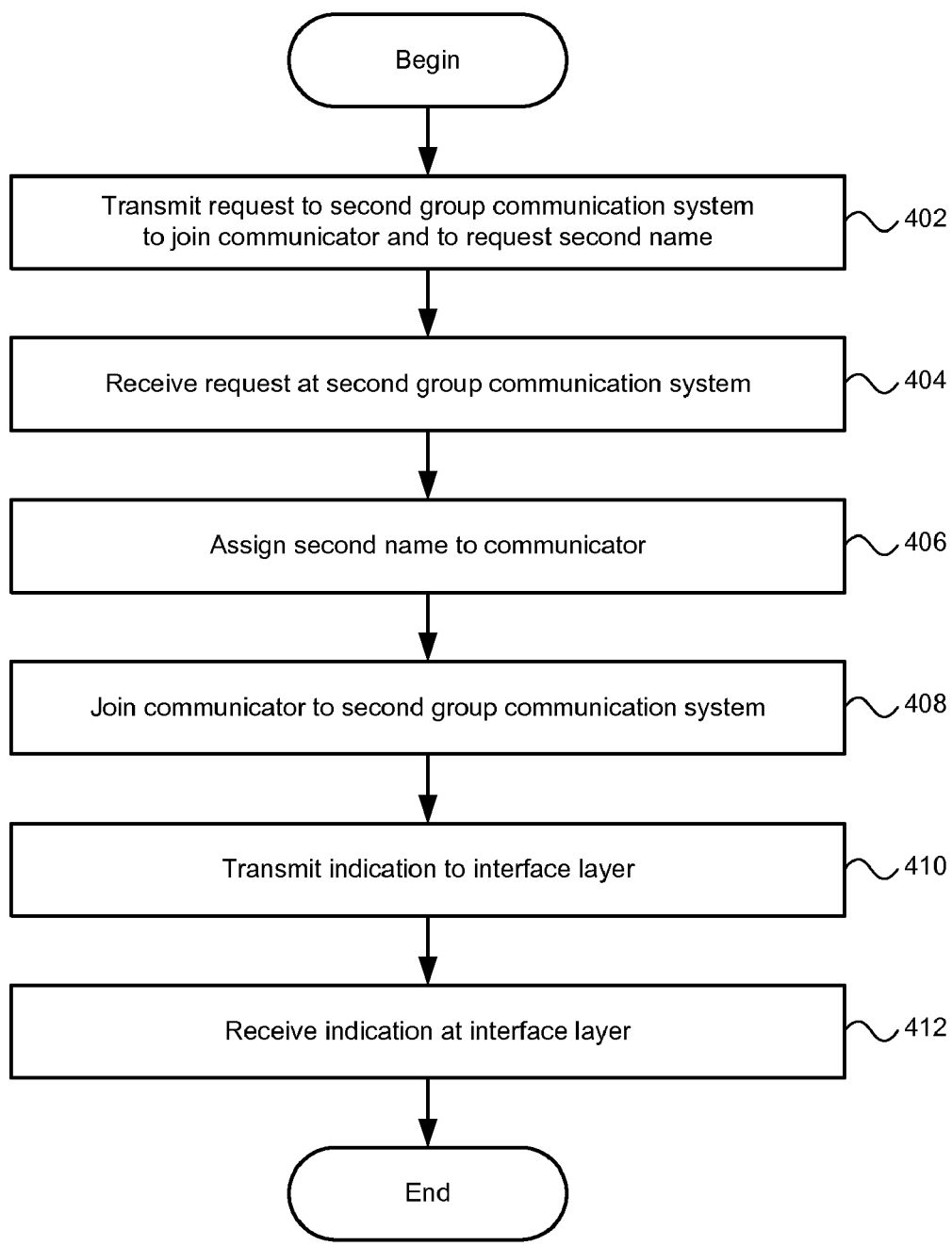
FIG. 4 demonstrates an example sequence of operations for performing an anonymous join of a communicator to the second group communication system.

In an embodiment of the present invention, joining operation 308 invokes the sequence of operations shown in FIG. 4. The operations shown in FIG. 4 cause the communicator to be known at the second group communication system by a second name assigned by the second group communication system.

Figure 5:
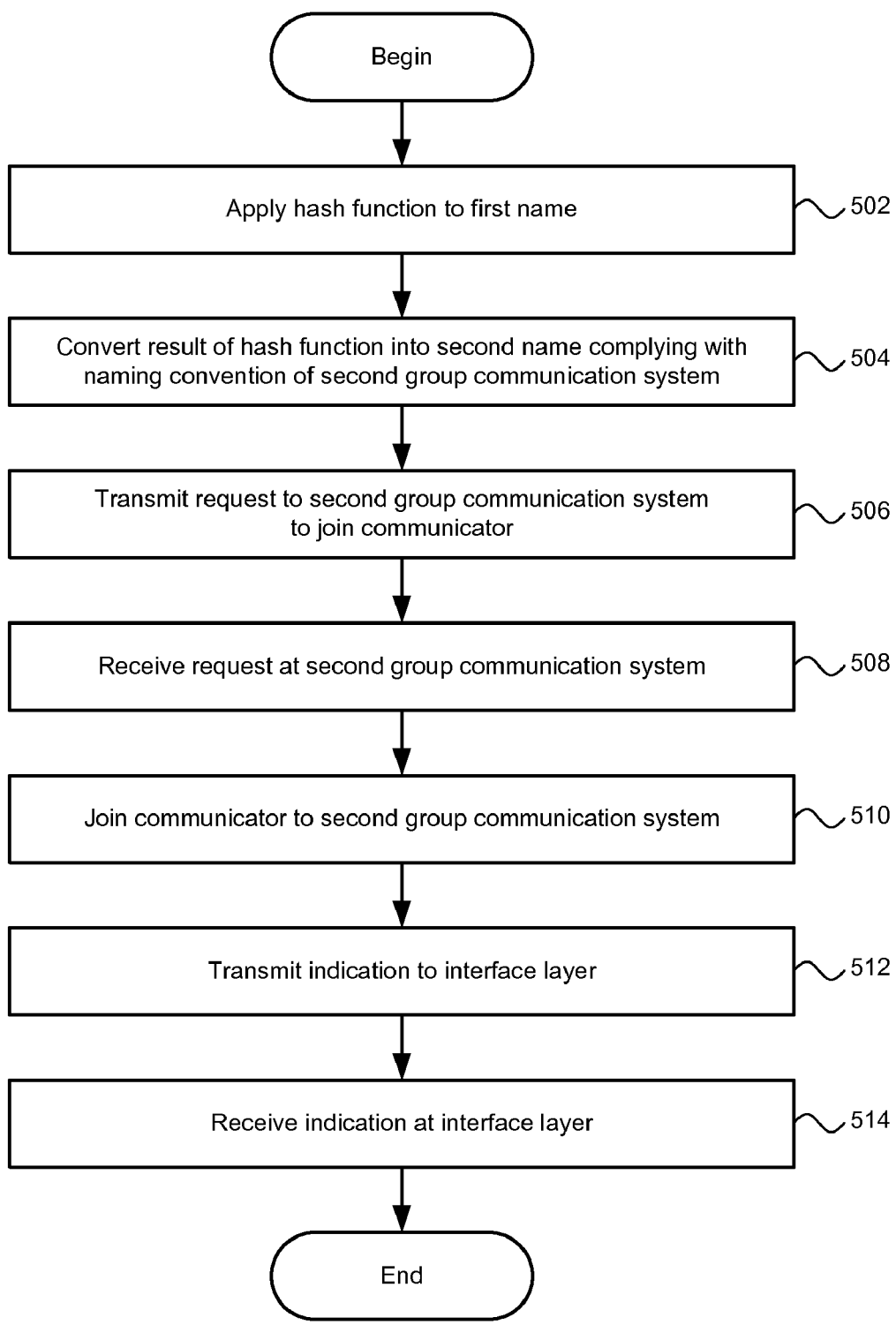
FIG. 5 demonstrates an example sequence of operations for performing a name-provided join of a communicator to the second group communication system.

In another embodiment of the present invention, joining operation 308 invokes the sequence of operations shown in FIG. 5. The operations shown in FIG. 5 cause the communicator to be known at the second group communication system by a second name generated by the interface layer.

It is emphasized that for both embodiments described above, the communicator has the second name at the second group communication system as a result of joining operation 308.

Moreover, for both embodiments described above, the communicator was joined to the first group communication system prior to joining operation 308. Furthermore, the communicator has a first name at the first group communication system.

After joining operation 308 is completed, control passes to adding operation 310.

At adding operation 310, the first name and the second name are added to a translation data structure. Specifically, a name association between the first name and the second name is recorded at the translation data structure. The translation data structure may be the translation data structure shown in FIG. 2 and may have any of the properties described above in regards to FIG. 2. The second name is added regardless of whether it was assigned by the second group communication system or generated by the interface layer. Adding the first name and the second name to the translation data structure causes translation between the first name and the second name to be performed as described below.

In an embodiment of the present invention as described above, the translation data structure comprises a single hashmap. Accordingly, an entry representing the name association is added to the hashmap. The key of the entry equals the second name, and the value of the entry equals the first name.

In another embodiment of the present invention as described above, the translation data structure comprises a first hashmap and a second hashmap. Accordingly, an entry is added to the first hashmap for which the key equals the first name and the value equals the second name. Another entry is added to the second hashmap for which the key equals the second name and the value equals the first name. Thus, the name association between the first name and the second name is recorded at both hashmaps.

After adding operation 310 is completed, control passes to broadcasting operation 312.

At broadcasting operation 312, a name association message is broadcast to the interface layer of all current members of a group. The group may include all members joined to the second group communication system. The group may instead include a subset of the members joined to the second group communication system. The name association message comprises the first name and the second name. The name association message further indicates that a name association exists between first name and the second name.

Figure 7:
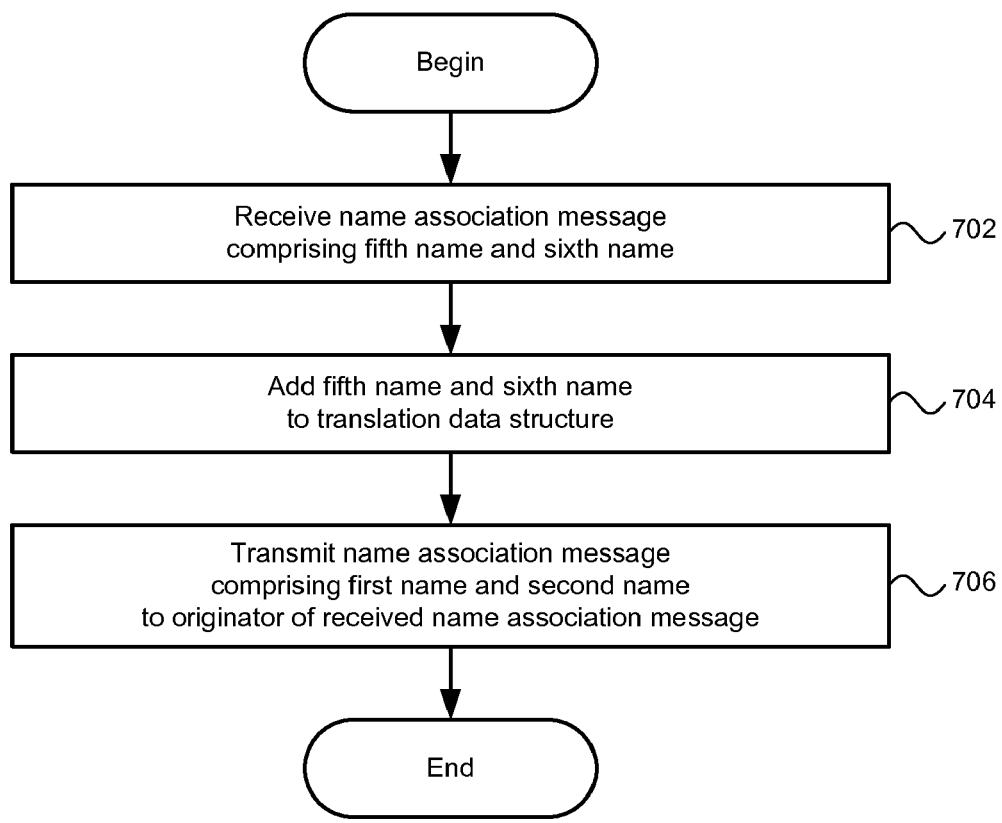
FIG. 7 demonstrates an example sequence of operations for processing a received name association message.

In an embodiment of the present invention, each interface layer receiving a name association message processes the received message according to the sequence of operations shown in FIG. 7. In another embodiment of the present invention, each interface layer receiving a name association message processes the received message according to the sequence of operations shown in FIG. 8.

After broadcasting operation 312 is completed, control passes to translating operation 314.

At translating operation 314, translation between the first name and the second name is performed in a communication between the communicator and the second group communication system. Translating operation 314 is performed based on the translation data structure. It is emphasized that translating operation 314 may be performed by a processor.

The communicator may be configured to identify itself using the first name by which it is known at the first group communication system. However, when communicating via the second group communication system, the communicator should identify itself using the second name by which it is known at the second group communication system. Therefore, translating operation 314 may translate the name of the originating communicator from the first name to the second name in communication originating from the communicator and being transmitted via the second group communication system.

Similarly, the communicator may address communication using the name by which a destination communicator is known at the first group communication system. However, when communicating via the second group communication system, the destination communicator should be identified using the name by which it is known at the second group communication system. Therefore, translating operation 314 may translate the name of the destination communicator from the name by which it is known at the first group communication system to the name by which it is known at the second group communication system in communication originating from the communicator and being transmitted via the second group communication system.

Conversely, communication addressed to the communicator and transmitted via the second group communication system may include a name by which the originating communicator is known at the second group communication system. However, the communicator may identify other communicators by their names at the first group communication system. Therefore, translating operation 314 may translate the name of the originating communicator from the name by which it is known at the second group communication system to the name by which it is known at the first group communication system in communication addressed to the communicator and transmitted via the second group communication system.

Similarly, communication addressed to the communicator and transmitted via the second group communication system may be addressed to the communicator using the second name by which the communicator is known at the second group communication system. However, the communicator may expect to receive communication addressed using the first name by which the communicator is known at the first group communication system. The communicator may, for example, ignore communication not addressed using the first name. Therefore, translating operation 314 may translate the name of the destination communicator from the second name to the first name in communication addressed to the communicator and transmitted via the second group communication system.

It is noted that some group communication systems, such as the IBM WebSphere Application Server software, require all copies of a group to have the same set of members which are alive (e.g., have not failed.) In other words, all copies of the group must maintain the same view. The DCS component included in the IBM WebSphere Application Server software employs very heavy protocols to enforce the requirement that all copies of a group maintain the same view.

In an embodiment of the present invention, the DCS component is not notified when a new member joins the second group communication system. Instead, the DCS component is notified that the new member has joined the second group communication system upon receiving the first message containing the name of the new member at the first group communication system. This beneficially avoids interfering with the protocols described above. Translating operation 314 may therefore transmit this notification.

Translating operation 314 may perform the translations described above for each pair of names for which a name association is recorded at the translation data structure. For example, if a communication originates from the communicator and is addressed to another communicator for which a name association is recorded, both the name of the originating communicator and the name of the name of the destination communicator may be translated.

Translating operation 314 may be repeated for each communication between the communicator and the second group communication system. However, the communicator may be removed from the second group communication system at a future point in time. The communicator may also fail at a future point in time. In either case, no more communications will involve the communicator unless the communicator is again joined to the second group communication system. Therefore, when the communicator either fails or is removed from the second group communication system, the sequence of operations shown in FIG. 3 terminates.

Turning now to FIG. 4, an example sequence of operations for performing an anonymous join of a communicator to the second group communication system is demonstrated.

An anonymous join is a join operation wherein the name by which the communicator should be known at the second group communication system is not specified. Therefore, the second group communication system assigns a second name to the communicator. Once joined to the second group communication system, the communicator is known thereat by the second name thus assigned. The interface layer then manages the relationship between the first name of the communicator at the first group communication system and the second name of the communicator thus assigned at the second group communication system. It is emphasized that in the sequence of operations shown in FIG. 4, the second name is determined by the second group communication system.

Thus, the operations shown in FIG. 4 advantageously facilitate interaction with a legacy group communication system configured to provide automatic generation of names which are unique throughout the LGCS.

The operations shown in FIG. 4 may be performed at an interface layer such as the interface layer shown in FIG. 2, except where otherwise noted. As described above, the interface layer may be implemented in computer readable program codes which are executed at a processor. Therefore, any of the operations performed by the interface layer may be performed at a processor.

As previously noted, the sequence of operations shown in FIG. 4 is invoked at joining operation 308 of FIG. 3. The operations shown in FIG. 3 operate on a communicator. The operations shown in FIG. 4 likewise operate on this communicator. It is emphasized that the properties of the environment described above in regards to FIG. 3 apply equally to FIG. 4.

At requesting operation 402, a request is transmitted to the second group communication system to join the communicator to the second group communication system. The request further requests the second name from the second group communication system.

The request may be a join command. Parameters included in the join command may provide the second group communication system with the machine addresses of a group-state routine and a message-handling routine implemented by the interface layer. The second group communication system is configured to invoke the group-state routine in order to transmit a notification to the communicator that another member joined the second group communication system, was removed from the second group communication system, or was detected as having failed by the second group communication system. Invoking the group-state routine may cause the sequence of operations shown in FIG. 6 to be invoked.

After requesting operation 402 is completed, control passes to receiving operation 404.

At receiving operation 404, the second group communication system receives the request transmitted at receiving operation 402. Receiving operation 404 may be performed at the second group communication system. After receiving operation 404 is completed, control passes to assigning operation 406.

At assigning operation 406, a second name is assigned to the communicator. Assigning operation 406 may be performed at the second group communication system. The second group communication system may assign the second name by means of the naming schemes implemented thereby. It is contemplated that as a result, the second name thus assigned complies with the naming convention of the second group communication system. After assigning operation 406 is completed, control passes to joining operation 408.

At joining operation 408, the communicator is joined to the second group communication system. As a result of joining operation 408, the communicator is known at the second group communication system by the second name assigned at assigning operation 406. Joining operation 408 may be performed at the second group communication system. After joining operation 408 is completed, control passes to transmitting operation 410.

At transmitting operation 410, an indication that the communicator was successfully joined to the second group communication system is transmitted to the interface layer. The indication includes the second name assigned to the communicator at assigning operation 406. If joining operation 408 failed for any reason, transmitting operation 410 may instead transmit an indication that the join operation failed. Transmitting operation 410 may be performed at the second group communication system. After transmitting operation 410 is completed, control passes to receiving operation 412.

At receiving operation 412, the indication transmitted at transmitting operation 410 is received at the interface layer. After receiving operation 412 is completed, control passes to recording operation 310 of FIG. 3. However, if the received indication specifies that the join operation failed, processing may terminate.

Turning now to FIG. 5, an example sequence of operations for performing a name-provided join of a communicator to the second group communication system is demonstrated.

A name-provided join is a join operation wherein the name by which the communicator should be known at the second group communication system is specified. Therefore, the interface layer generates a second name via an internal algorithm. The algorithm ensures that the generated name is compliant with the naming convention of the second group communication system. The algorithm is also configured to ensure that there is a very high probability that a one-to-one relationship between the first name and the second name exists. Conversely, there is a very low probability that two different first names are mapped to the same second name. Once joined to the second group communication system, the communicator is known thereat by the second name generated by the algorithm. The interface layer then manages the relationship between the first name of the communicator at the first group communication system and the second name of the communicator thus generated. It is emphasized that in the sequence of operations shown in FIG. 5, the second name is determined by the system implementing the algorithm.

Thus, the operations shown in FIG. 5 advantageously facilitate interaction with a legacy group communication system in which a user is required to provide a name at which a communicator is to be known at the LGCS.

The operations shown in FIG. 5 may be performed at an interface layer such as the interface layer shown in FIG. 2, except where otherwise noted. As described above, the interface layer may be implemented in computer readable program codes which are executed at a processor. Therefore, any of the operations performed by the interface layer may be performed at a processor. It is emphasized that in performing the operations shown in FIG. 5, the interface layer implements the algorithm described above. Therefore, the second name is determined by the interface layer.

As previously noted, the sequence of operations shown in FIG. 5 is invoked at joining operation 308 of FIG. 3. The operations shown in FIG. 3 operate on a communicator. The operations shown in FIG. 5 likewise operate on this communicator. It is emphasized that the properties of the environment described above in regards to FIG. 3 apply equally to FIG. 5.

An algorithm as described above is applied to the first name. The first step of this algorithm, performed at hashing operation 502, is to apply a hash function to the first name.

In an embodiment of the present invention, hashing operation 502 instantiates the java.security.MessageDigest class included in the Java platform. Upon instantiating the class, "SHA-512" is specified as the algorithm. As a result, the Secure Hash Algorithm 512 hash function, computed with 64-bit words, is employed as the hash function. The first name is passed to the hash function as arbitrary-sized input data. The hash function returns a fixed-length hash value.

Those skilled in the art will appreciate that hash functions are configured to ensure that the probability that two different input values will result in the same output value is very low. Therefore, the probability that a naming collision occurs due to two different first names being converted to the same second name is very low.

After hashing operation 502 is completed, control passes to converting operation 504.

The algorithm is configured to generate a name complying with the naming convention of the second group communication system. Accordingly, the second step of the algorithm, performed at converting operation 504, is to convert a result of the hash function into a string complying with the naming convention of the second group communication system. The resulting string is used as the second name.

In an embodiment of the present invention, a number of byte positions required for the length of the second name are selected from the beginning of the fixed-length hash value returned by the hash function. Each byte position contains a code point in the coded character set. Such code points include letters, numbers, and special characters. Each selected byte position is then replaced with a value based on the modulus of the integer value of the position less the minimum value of a byte, e.g., negative 128. Moreover, any special characters included in the result which contravene the naming convention of the second group communication system are replaced by characters complying with the naming convention. Other special characters, such as colons (":") and at signs ("@"), may also be replaced. Replacing a non-compliant character or other special character may be achieved by adjusting the numeric displacement of the character in the coded character set to a displacement of a compliant character. The result of the preceding subtasks is used as the second name.

After converting operation 504 is completed, control passes to requesting operation 506.

At requesting operation 506, a request is transmitted to the second group communication system to join the communicator to the second group communication system. The request specifies the second name generated by the algorithm at hashing operation 502 and converting operation 504.

The request may be a join command. The join command may include the parameters described above in regards to FIG. 4.

After requesting operation 506 is completed, control passes to receiving operation 508.

At receiving operation 508, the second group communication system receives the request transmitted at receiving operation 506. Receiving operation 508 may be performed at the second group communication system. After receiving operation 508 is completed, control passes to joining operation 510.

At joining operation 510, the communicator is joined to the second group communication system. As a result of joining operation 510, the communicator is known at the second group communication system by the second name generated by the algorithm and specified by the request received at receiving operation 508. Joining operation 510 may be performed at the second group communication system.

The second group communication system may ensure that no member known by the second name already exists at the second group communication system, a group defined thereby, or both. If a member known by the second name already exists, joining operation 510 fails. It is contemplated that the probability of a naming collision is very low for the reasons described above.

After joining operation 510 is completed, control passes to transmitting operation 512.

At transmitting operation 512, an indication that the communicator was successfully joined to the second group communication system is transmitted to the interface layer. The indication may include the second name by which the communicator is known at the second group communication system. If joining operation 510 failed for any reason, transmitting operation 512 may instead transmit an indication that the join operation failed. Transmitting operation 512 may be performed at the second group communication system. After transmitting operation 512 is completed, control passes to receiving operation 514.

At receiving operation 514, the indication transmitted at transmitting operation 512 is received at the interface layer. After receiving operation 514 is completed, control passes to recording operation 310 of FIG. 3. However, if the received indication specifies that the join operation failed, processing may terminate.

Figure 6:
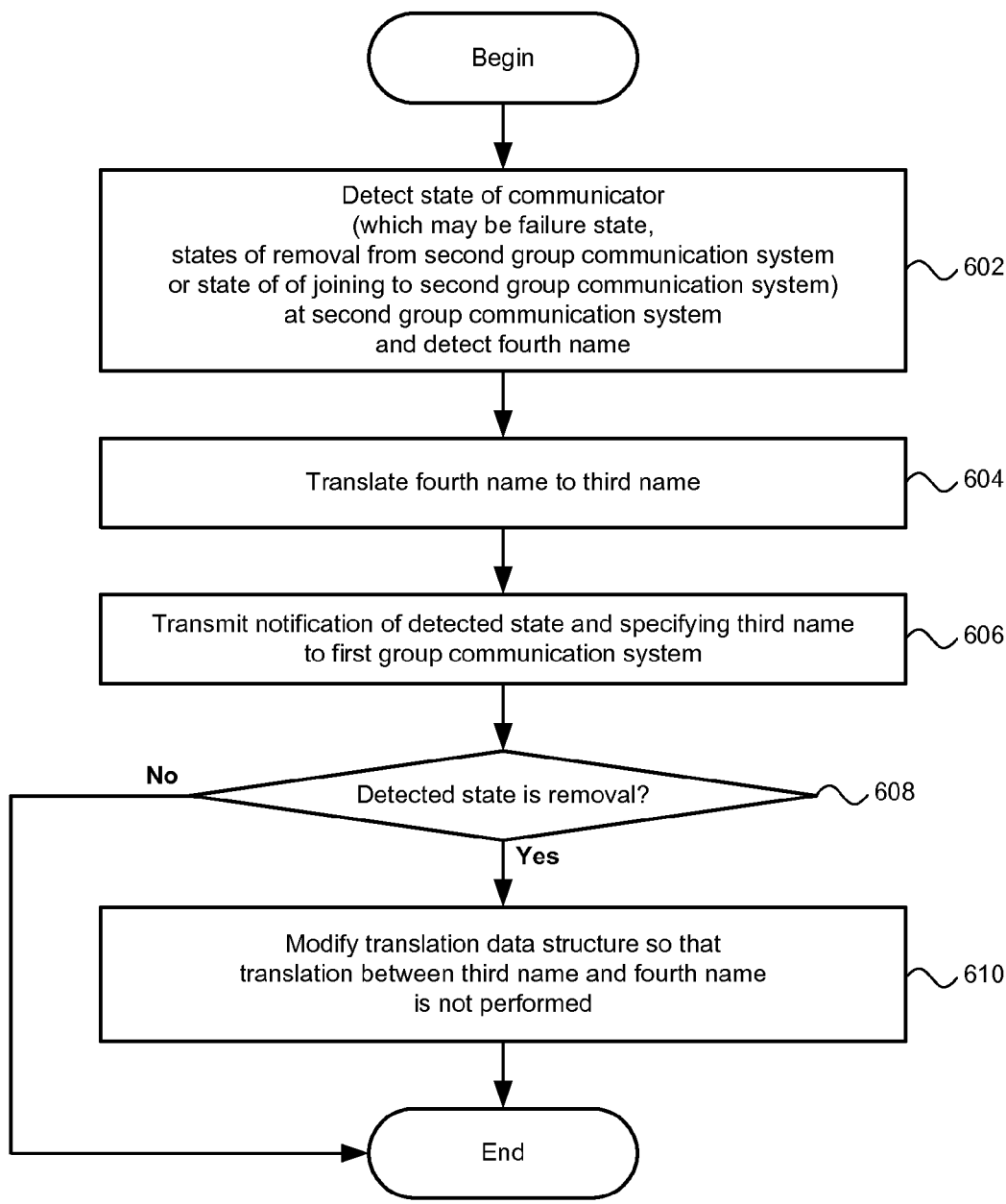
FIG. 6 demonstrates an example sequence of operations for handling removals and failures of a communicator at the second group communication system.

Turning now to FIG. 6, an example sequence of operations for handling removals and failures of a communicator at the second group communication system is demonstrated.

The operations shown in FIG. 6 may be performed at an interface layer such as the interface layer shown in FIG. 2. As described above, the interface layer may be implemented in computer readable program codes which are executed at a processor. Therefore, any of the operations performed by the interface layer may be performed at a processor.

The interface layer may exist within an environment such as the environment shown in FIG. 1 and described above in regards to FIG. 1. The first group communication system may be the first group communication system shown in FIG. 1 and may have any of the properties described above in regards to FIG. 1. Similarly, the second group communication system may be the second group communication system shown in FIG. 1 and may have any of the properties described above in regards to FIG. 1.

As described above, the second group communication system may include functionality to monitor the liveness state of each member joined to the second group communication system. Therefore, the second group communication system may detect that a member joined thereto is in a failure state. The second group communication system may also be aware that a member has been removed from it. In either case, it is advantageous to notify the first group communication system of the state change of the member. The notification clearly must identify the member. However, the member is known as a different name at the first group communication system than at the second group communication system. Because the second group communication system detected the state change, the state change is reported using the name of the member at the second group communication system. It is therefore advantageous to translate this name to the name of the member at the first group communication system before notifying the first group communication system of the state change.

Accordingly, at detecting operation 602, a state of a communicator at the second group communication system is detected. The communicator for which the state is detected has a third name at the first group communication system and a fourth name at the second group communication system. Detecting the state of the communicator comprises detecting the fourth name.

The detected state may be a failure state. The detected state may also be a state of removal from the second group communication system. The detected state may also be a state of being joined to the second group communication system.

As described above regarding FIG. 4, the second group communication system may be configured to invoke a group-state routine in order to notify the communicator that another member joined the second group communication system, was removed from the second group communication system, or was detected as having failed by the second group communication system. The group-state routine may comprise program code included in the interface layer. The second group communication system may directly invoke this program code to provide a notification of the detected state. Detecting operation 602 may be configured to detect that the group-state routine has been invoked. The specific state detected and the fourth name of the communicator may be parameters passed to the group-state routine. Thus, detecting operation 602 may detect the specific state and the fourth name by accepting these two parameters as input. Accordingly, detecting operation 602 may be performed by the group-state routine.

After detecting operation 602 is completed, control passes to translating operation 604. Specifically, the group-state routine may invoke other program code at the interface layer configured to perform translating operation 604.

At translating operation 604, the fourth name is translated to the third name. Translating operation 604 is performed using a translation data structure. The translation data structure may be the translation data structure shown in FIG. 2 and may have any of the properties described above in regards to FIG. 2. After translating operation 604 is completed, control passes to notifying operation 606.

At notifying operation 606, a notification of the detected state is transmitted to the first group communication system. The notification may specify which state was detected. The notification further specifies the third name determined at translating operation 604. A notification as thus described may also be transmitted to the communicator. After notifying operation 606 is completed, control passes to determining operation 608.

At determining operation 608, it is determined whether the detected state is a state of removal from the second group communication system. If the detected state is a state of removal from the second group communication system, control passes to modifying operation 610. If the detected state is any other state, such as a failure state or a state of being joined to the second group communication system, processing terminates.

At modifying operation 610, the translation data structure is modified so that translation between the third name and the fourth name is not performed. The third name and the fourth name may be removed from the translation data structure. The third name and the fourth name may instead be marked as being in a removed, inactive or obsolete state so that they are ignored by translating operation 314 of FIG. 3 and translating operation 604 of FIG. 6. In either case, a name association no longer exists between the third name and the fourth name at the translation data structure.

In an embodiment of the present invention as described above, the translation data structure comprises a single hashmap. Accordingly, the entry in the hashmap for which the key equals the fourth name is removed or marked as being in an inactive state.

In another embodiment of the present invention as described above, the translation data structure comprises a first hashmap and a second hashmap. Accordingly, the entry in the first hashmap for which the key equals the third name is removed or marked as being in an inactive state. The entry in the second hashmap for which the key equals the fourth name is removed or marked as being in an inactive state.

After modifying operation 610 is completed, processing terminates.

It is noted that if the communicator requests its own removal from the second group communication system, the translation data structure may be employed to translate the first name of the communicator at the first group communication system to the second name of the communicator at the second group communication system. A request may then be transmitted to the second group communication system to request removal of the communicator therefrom. The request thus includes the second name.

Turning now to FIG. 7, an example sequence of operations for processing a received name association message is demonstrated.

The operations shown in FIG. 7 may be performed at an interface layer such as the interface layer shown in FIG. 2. As described above, the interface layer may be implemented in computer readable program codes which are executed at a processor. Therefore, any of the operations performed by the interface layer may be performed at a processor.

The interface layer may exist within an environment such as the environment shown in FIG. 1 and described above in regards to FIG. 1. The first group communication system may be the first group communication system shown in FIG. 1 and may have any of the properties described above in regards to FIG. 1. Similarly, the second group communication system may be the second group communication system shown in FIG. 1 and may have any of the properties described above in regards to FIG. 1.

The operations shown in FIG. 7 are performed on behalf of a specific communicator. This communicator has a first name at the first group communication system and a second name at the second group communication system.

At receiving operation 702, a name association message is received. The name association message may have been transmitted by a communicator which was recently joined to a group communication system. Alternatively, the name association message may have been transmitted by an interface layer associated with the recently joined communicator. The recently joined communicator has a fifth name at the first group communication system and a sixth name at the second group communication system. The name association message comprises the fifth name and the sixth name. After receiving operation 702 is completed, control passes to adding operation 704.

At adding operation 704, the fifth name and the sixth name are added to a translation data structure. The translation data structure may be the translation data structure shown in FIG. 2 and may have any of the properties described above in regards to FIG. 2. Adding the fifth name and the sixth name to the translation data structure causes translation between the fifth name and the sixth name to be performed. Adding operation 704 may be performed on behalf of an associated process at the first group communication system.

In an embodiment of the present invention as described above, the translation data structure comprises a single hashmap. Accordingly, an entry is added to the hashmap for which the key equals the sixth name and the value equals the fifth name.

In another embodiment of the present invention as described above, the translation data structure comprises a first hashmap and a second hashmap. Accordingly, an entry is added to the first hashmap for which the key equals the fifth name and the value equals the sixth name. Another entry is added to the second hashmap for which the key equals the sixth name and the value equals the fifth name.

After adding operation 704 is completed, control passes to transmitting operation 706.

At transmitting operation 706, a name association message is transmitted to the originator of the name association message received at receiving operation 702. The name association message comprises the first name and the second name. After transmitting operation 706 is completed, processing terminates.

Figure 8:
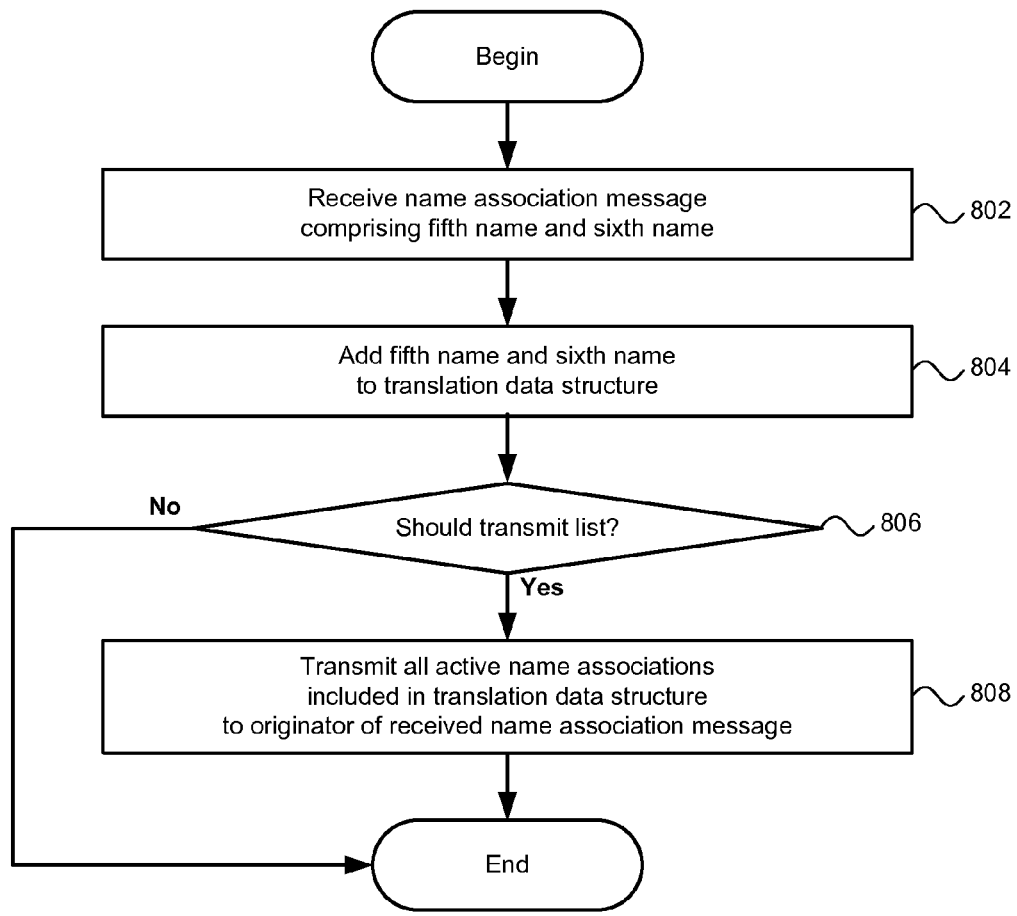
FIG. 8 demonstrates another example sequence of operations for processing a received name association message.

Turning now to FIG. 8, another example sequence of operations for processing a received name association message is demonstrated.

The operations shown in FIG. 8 may be performed at an interface layer such as the interface layer shown in FIG. 2. As described above, the interface layer may be implemented in computer readable program codes which are executed at a processor. Therefore, any of the operations performed by the interface layer may be performed at a processor.

The interface layer may exist within an environment such as the environment shown in FIG. 1 and described above in regards to FIG. 1. The first group communication system may be the first group communication system shown in FIG. 1 and may have any of the properties described above in regards to FIG. 1. Similarly, the second group communication system may be the second group communication system shown in FIG. 1 and may have any of the properties described above in regards to FIG. 1.

The operations shown in FIG. 8 are performed on behalf of a specific communicator. This communicator has a first name at the first group communication system and a second name at the second group communication system.

At receiving operation 802, a name association message is received. The name association message may have been transmitted by a communicator which was recently joined to a group communication system. Alternatively, the name association message may have been transmitted by an interface layer associated with the recently joined communicator. The recently joined communicator has a fifth name at the first group communication system and a sixth name at the second group communication system. The name association message comprises the fifth name and the sixth name. After receiving operation 802 is completed, control passes to adding operation 804.

At adding operation 804, the fifth name and the sixth name are added to a translation data structure. The translation data structure may be the translation data structure shown in FIG. 2 and may have any of the properties described above in regards to FIG. 2. Adding the fifth name and the sixth name to the translation data structure causes translation between the fifth name and the sixth name to be performed. Adding operation 804 may be performed on behalf of an associated process at the first group communication system. Adding operation 804 may further comprise any of the subtasks described above for adding operation 704 of FIG. 7. After adding operation 804 is completed, control passes to determining operation 806.

At determining operation 806, it is determined whether the interface layer should transmit a list of active name associations. A specified number of members transmit the list of active name associations. The specified number may be configured to be any number ranging from 1 to the total number of members currently joined to a group communication system. The specified number may be selected deterministically. A wide variety of algorithms known in the art may be employed to determine whether the member on whose behalf the operations in FIG. 8 are performed should transmit the list of active name associations. If it is determined that the list of active name associations should be transmitted, control passes to transmitting operation 808. If it is determined that the list of active name associations should not be transmitted, processing terminates.

At transmitting operation 808, all active name associations included in the translation data structure are transmitted to the originator of the name association message received at receiving operation 802. Transmitting operation 808 may omit any name associations marked as being in a removed, inactive or obsolete state at modifying operation 606 of FIG. 6.

In an embodiment of the present invention, the translation data structure comprises a hashmap for each direction in which the name may be converted. Thus, a name association may be recorded as an entry in each hashmap. Transmitting operation 808 may transmit only the entries included in a single hashmap. More generally, transmitting operation 808 may transmit the name conversions in one direction only. This is because the reverse direction can be trivially derived from the transmitted direction.

After transmitting operation 808 is completed, processing terminates.

Another aspect of the invention is directed to embodiments that can be embodied in the form of computer-implemented processes and apparatuses for practicing those processes. For example, the computer implemented operations for facilitating communication between a first group communication system and a second group communication system are embodied in computer program code executed by computer processors.

Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention.

Embodiments include computer program code logic, for example, whether stored in a storage medium, loaded into and/or executed by a computer, wherein, when the computer program code logic is loaded into and executed by a computer, the computer becomes an apparatus for practicing the invention. When implemented on a general-purpose microprocessor, the computer program codes configure the microprocessor to create specific logic circuits.

Additionally, at least one program storage device readable by a machine, tangibly embodying at least one program of instructions executable by the machine to perform the capabilities of the system can be provided. The article of manufacture can be included as a part of a computer system or sold separately.

The capabilities of the operations for facilitating communication between a first group communication system and a second group communication system can be implemented in software, firmware, hardware or some combination thereof. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. Furthermore, the use of the terms a, an, etc. do not denote a limitation of quantity, but rather denote the presence of at least one of the referenced item.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for facilitating communication between a first group communication system and a second group communication system, the method comprising:
   joining a communicator to the second group communication system, the communicator being previously joined to the first group communication system and having a first name at the first group communication system, the communicator having a second name at the second group communication system, the first name contravenes a naming convention of the second group communication system;
   translating by a processor between the first name and the second name in a communication between the communicator and the second group communication system, wherein translating is performed based on a translation data structure;
   applying an algorithm to the first name, wherein the algorithm is configured to generate a name complying with the naming convention of the second group communication system,
   wherein the algorithm comprises applying a hash function to the first name.

2. The method of claim 1, further comprising requesting the second name from the second group communication system.

3. The method of claim 1, wherein the algorithm comprises applying a hash function to the first name.

4. The method of claim 1, further comprising:
   detecting a state of a communicator at the second group communication system, the communicator for which the state is detected having a third name at the first group communication system and a fourth name at the second group communication system, wherein detecting the state of the communicator comprises detecting the fourth name;
   translating the fourth name to the third name; and
   transmitting a notification of the detected state to the first group communication system, wherein the notification specifies the third name.

5. The method of claim 4, wherein the detected state is a failure state.

6. The method of claim 4, further comprising:
   wherein the detected state is a state of removal from the second group communication system; and
   modifying the translation data structure so that translation between the third name and the fourth name is not performed.

7. The method of claim 1, further comprising:
   receiving a name association message comprising a fifth name and a sixth name, wherein a communicator has the fifth name at the first group communication system and the sixth name at the second group communication system; and
   adding the fifth name and the sixth name to the translation data structure.

8. The method of claim 7, further comprising transmitting, to an originator of the received name association message, a name association message comprising the first name and the second name.

9. The method of claim 7, further comprising transmitting, to an originator of the received name association message, all active name associations included in the translation data structure.

10. A computer program product embodied in a computer usable memory comprising:
    computer readable program codes coupled to the computer usable medium for facilitating communication between a first group communication system and a second group communication system, the computer readable program codes configured to cause the program to:
    join a communicator to the second group communication system, the communicator being previously joined to the first group communication system and having a first name at the first group communication system, the communicator having a second name at the second group communication system;
    translate between the first name and the second name in a communication between the communicator and the second group communication system, wherein translating is performed based on a translation data structure;
    wherein a naming convention of the first group communication system allows at least one name which contravenes a naming convention of the second group communication system; and
    join the communicator to the second group communication system includes program code configured to generate the second name by applying an algorithm to the first name, wherein the algorithm is configured to generate a name complying with the naming convention of the second group communication system;
    wherein the algorithm comprises applying a hash function to the first name.

11. The computer program product of claim 10, wherein the program code configured to join the communicator to the second group communication system includes program code configured to request the second name from the second group communication system.

12. The computer program product of claim 10, further comprising program code configured to:
    detect a state of a communicator at the second group communication system, the communicator for which the state is detected having a third name at the first group communication system and a fourth name at the second group communication system, wherein detecting the state of the communicator comprises detecting the fourth name;
    translate the fourth name to the third name; and
    transmit a notification of the detected state to the first group communication system, wherein the notification specifies the third name.

13. The computer program product of claim 12, wherein the detected state is a failure state.

14. The computer program product of claim 12, wherein the detected state is a state of removal from the second group communication system; and
    further comprising program code configured to modify the translation data structure so that translation between the third name and the fourth name is not performed.

15. The computer program product of claim 10, further comprising program code configured to:
    receive a name association message comprising a fifth name and a sixth name, wherein a communicator has the fifth name at the first group communication system and the sixth name at the second group communication system; and
    add the fifth name and the sixth name to the translation data structure.

16. The computer program product of claim 15, further comprising program code configured to transmit, to an originator of the received name association message, a name association message comprising the first name and the second name.

17. The computer program product of claim 15, further comprising program code configured to transmit, to an originator of the received name association message, all active name associations included in the translation data structure.

* * * * *